(No Model.)

W. W. SWEIGART.
NUT LOCK.

No. 606,253. Patented June 28, 1898.

Witnesses

Inventor
Webster W. Sweigart
Attorney

UNITED STATES PATENT OFFICE.

WEBSTER W. SWEIGART, OF YORK ROAD, MARYLAND.

NUT-LOCK.

SPECIFICATION forming part of Letters Patent No. 606,253, dated June 28, 1898.

Application filed March 9, 1898. Serial No. 673,216. (No model.)

*To all whom it may concern:*

Be it known that I, WEBSTER W. SWEIGART, a citizen of the United States, residing at York Road, in the county of Carroll and State of Maryland, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates generally to nut-locks, and particularly to those of the "base-washer" type, consisting of a washer encircling the bolt and having a base adapted to rest on the rail or fish-plate base and a spring locking-arm adapted to engage the nut.

The object of the present invention is the provision of a nut-lock of the class described, of a simple and inexpensive construction, which will permit of the quick and easy unscrewing of the nut at any time without necessitating the use of a tool to pry back or manipulate the spring locking-arm, as well as allowing the rapid screwing up and locking of the nut. The object is accomplished by the provision of a spring locking-arm of improved construction and peculiar disposition, as will appear more fully hereinafter and as particularly pointed out in the claims.

Figure 1:
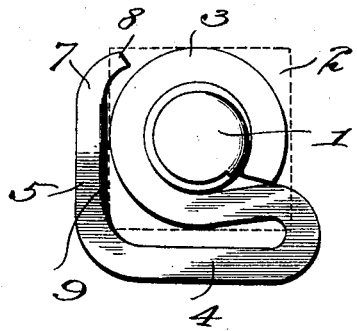
Figure 2:
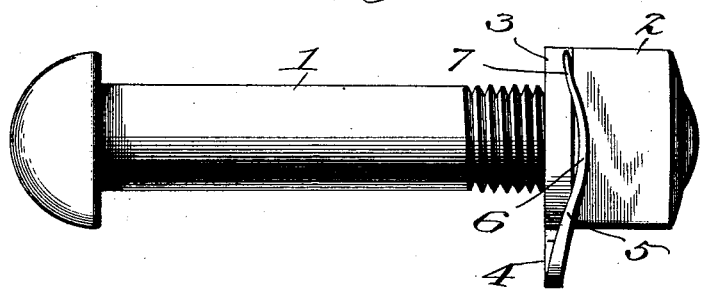
Figure 3:
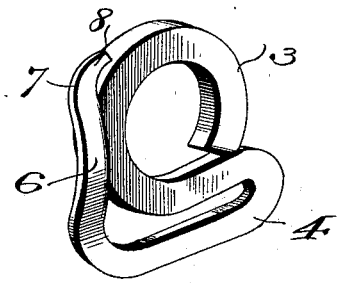

In the accompanying drawings, Figure 1 is an end view of a bolt and nut equipped with my improved nut-lock, the nut being shown in dotted lines; Fig. 2, a side elevation with all the parts in full lines, and Fig. 3 a detail view of the nut-lock.

An ordinary bolt is shown at 1, and 2 represents the nut therefor.

My improved nut-lock is constructed of a single piece of spring metal, preferably steel, which is bent into a washer 3, base 4, and locking-arm 5. The washer is of a size to properly fit the shank of a bolt, and it may be completely closed or partially open, as desired. This washer is of the same thickness throughout; but the base and locking-arm are tapered or thinned down, so as to give them the necessary degree of resiliency. The base, which, as usual, is adapted to fit on the rail or fish-plate base, is formed by bending the metal downward from the washer at a point substantially opposite the locking-arm and extending it in tangential relation to the washer in the plane of the latter. By this manner of bending a base of comparatively great length is provided which is free to give or spring with the locking-arm, so that the latter readily gives to the screwing or unscrewing of the nut and yet is of proper rigidity for securely locking the same. The locking-arm is of a substantially compound-curve shape, with its larger curve 6 disposed beyond the plane of the outer face of the washer, closely adjacent the periphery of the latter, and its smaller curve 7 terminating at the tip 8, which extends in toward the washer at an angle to the length of the locking-arm and lies substantially in the same plane as the outer face of the washer or slightly back of it. The edge of the locking-arm adjacent to the washer is beveled at 9, where the nut strikes when it is being turned on or off the bolt.

In using the device the washer is first slipped on the bolt and against the fish-plate, with the base resting on the rail or fish-plate base. On applying the nut to the bolt and screwing it up against the lock its corners strike successively against the lower beveled and inclined portion 9 of the curved part 6 and, after riding on the curved portion and pressing back the locking-arm, rides down the smaller curve 7 and off. This continues as the nut is screwed on until it is against the washer, whereupon one of the straight sides of the nut will lie against the edge of the curved portion 6 and the corner of the nut against the tip 8, when the nut will be securely locked.

I obviate the drawback heretofore generally incident to nut-locks of this class—*i. e.*, prying back the locking-arm in order to allow unscrewing of the nut—by the employment of the tip 8 and beveled and curved portion 6 adjacent thereto. When it is attempted to unscrew the nut, the corner thereof lying against the tip 8 rides on the latter and the smaller curve 7, gradually pressing the locking-arm back until the corner of the nut finally clears it. If the nut is not then entirely free, its continued unscrewing and the repetition of this action will render it so. It will be seen, therefore, that the nut can be readily screwed up and automatically locked securely, but that its removal can be easily accomplished at any time by simply unscrewing it without necessitating the use of an extra tool for manipulating the locking-arm.

Having thus described my invention, what I claim as new, and desire to secure by Letters Patent, is—

1. A nut-lock consisting of a single piece of metal bent to form a washer to receive the bolt and the balance of the metal after the formation of the washer bent to form a spring locking-arm, the portion of the metal forming said spring-arm bent at a point at or near its middle to constitute two members at right angles or approximately at right angles to each other, one of said portions adapted to engage a base for preventing the lock from turning, and the other to engage the edge of the nut to be locked, the entire arm from the point where it leaves the washer being resilient.

2. A nut-lock consisting of a strip of metal bent to form a washer and a spring locking-arm, the portion constituting the latter being bent approximately at right angles at or near its center one portion of the arm in the plane with the washer and the other portion bent outwardly into a plane outside of the washer into the path of the nut to be locked and the extreme end of the arm being bent back below the plane of the inner face of the nut.

3. A nut-lock consisting of a strip of metal bent to form a washer, and the portion of the strip remaining after the formation of the washer bent downward and backward to form a base portion 4 and then at right angles to engage an edge of the nut to lock the latter against turning.

4. The herein-described nut-lock consisting of a single piece of resilient material bent at one end into a washer and bent downward from one side and back to the other side thereof in separated and substantially tangential relation thereto to form a base and then bent into an upright locking-arm at the latter-named side of the washer having a beveled nut-locking edge tangentially disposed in relation thereto, said arm being bowed or curved outwardly from the plane of the washer and terminating in an end bent toward the washer and lying substantially in or slightly back of the plane thereof for the purpose of guiding the corner of the nut onto the arm when the nut is unscrewed, substantially as described.

In witness whereof I affix my signature in presence of two witnesses.

WEBSTER W. SWEIGART.

Witnesses:
C. E. VALENTINE,
C. H. ILGENFRITZ.